United States Patent
Dorado et al.

(10) Patent No.: US 11,310,113 B2
(45) Date of Patent: Apr. 19, 2022

(54) METHODS, SYSTEMS AND APPARATUS TO IMPROVE CLUSTER EFFICIENCY

(71) Applicant: Intel Corporation, Santa Clara, CA (US)

(72) Inventors: Rene O. Dorado, Hillsboro, OR (US); Abolfazl Shahbazi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 15/166,539

(22) Filed: May 27, 2016

(65) Prior Publication Data

US 2017/0346690 A1    Nov. 30, 2017

(51) Int. Cl.
*G06F 9/46* (2006.01)
*H04L 41/0823* (2022.01)
*H04L 41/5041* (2022.01)

(52) U.S. Cl.
CPC ...... *H04L 41/0823* (2013.01); *H04L 41/5045* (2013.01)

(58) Field of Classification Search
CPC ............... H04L 41/0823; H04L 41/5045
See application file for complete search history.

(56) References Cited

U.S. PATENT DOCUMENTS

| | | | |
|---|---|---|---|
| 6,718,358 B1 * | 4/2004 | Bigus | G06F 9/5061 706/10 |
| 10,042,673 B1 * | 8/2018 | Espy | G06F 9/5005 |
| 10,356,167 B1 * | 7/2019 | Dolas | H04L 67/1097 |
| 2005/0060391 A1 | 3/2005 | Kaminsky et al. | |
| 2008/0021988 A1 | 1/2008 | Abernethy et al. | |
| 2011/0173302 A1 | 7/2011 | Rider | |
| 2013/0054808 A1 | 2/2013 | Hildebrand et al. | |
| 2013/0204948 A1 * | 8/2013 | Zeyliger | G06F 9/44505 709/206 |
| 2014/0095676 A1 * | 4/2014 | Beno | G06F 8/60 709/220 |
| 2015/0033241 A1 | 1/2015 | Jackson | |
| 2017/0208138 A1 * | 7/2017 | Baxter | H04L 67/16 |

OTHER PUBLICATIONS

Intel Corporation, "Making Better Matches with Intel Exon Processors," Case Study, Jun. 2015, 3 pages.
(Continued)

*Primary Examiner* — Tammy E Lee
(74) *Attorney, Agent, or Firm* — Hanley, Flight & Zimmerman, LLC

(57) ABSTRACT

Methods, apparatus, systems and articles of manufacture are disclosed to improve cluster efficiency. An example apparatus includes a cluster manager to identify cluster resource details to execute a workload, a workload manager to parse the workload to identify services to be executed by cluster resources, and an optimization formula manager to identify service optimization formulas associated with respective ones of the identified services, and improve cluster resource efficiency by generating a cluster formula configuration to calculate cluster parameter values for the cluster resources.

32 Claims, 7 Drawing Sheets

(56) References Cited

OTHER PUBLICATIONS

Wikipedia, "Computer Cluster," last modified May 8, 2016, retrieved from <https://en.wikipedia.org/w/index.php?title=Computer_cluster&oldid=719201275>, 10 pages.
Wikipedia, "MapReduce," last modified Apr. 16, 2016, retrieved from <https://en.wikipedia.org/w/index.php?title=MapReduce&oldid=715537426>, 11 pages.
International Searching Authority, "Written Opinion", issued in connection with PCT Patent Application No. PCT/US2017/028590, dated Jul. 21, 2017, 8 pages.
International Searching Authority, "Search Report", issued in connection with PCT Patent Application No. PCT/US2017/028590, dated Jul. 21, 2017, 5 pages.

\* cited by examiner

200

\# Workload services and parameters

202 →OVER_COMMIT_FACTOR: 1.30 # Overcommit factor for JVM

204 →MEM_FRACTION_FOR_HBASE: 0.125  # Suggested Max Memory fraction for HBase

MEM_FRACTION_FOR_OTHER_SERVICES: 0.125 # Suggested Memory fraction for other system resources

206 →MAPREDUCE_JOB_COUNTERS_MAX: 500

208 →SPARK_DRIVER_MAXPERMSIZE: 512 # This is required for running in yarn-cluster mode 210 →YARN_SCHEDULER_MINIMUM_ALLOCATION_MB: 1024 # increase this in 512 increaments but usualy it should not be changed ENABLE_SPARK_SHUFFLE_SERVICE: true # Set this to "true" in order to enable this service for large workloads 212 →ZOOKEEPER_IS_EXTERNAL: true # Set this to "false" in order to run Zookeeper in local mode NUM_THREADS: 1 # This should be set to the maximum number of munti-tenant users MAPREDUCE_MINIMUM_AM_MEMORY_MB: 4096 # increase this in 512 increaments to create larger containers MAPREDUCE_MINIMUM_EXECUTOR_MEMORY_MB: 4096 # increase this in 512 increaments to create larger containers ENABLE_DYNAMIC_ALLOCATION_FOR_SPARK: true # set this to false in order to disable SPARK dynamic allocation

FIG. 2

METHODS, SYSTEMS AND APPARATUS TO IMPROVE CLUSTER EFFICIENCY

FIELD OF THE DISCLOSURE

This disclosure relates generally to distributed computing, and, more particularly, to methods, systems and apparatus to improve cluster efficiency.

BACKGROUND

In recent years, clusters of computing resources have been deployed in a distributed manner to operate on computing tasks associated with data center activities. The computing tasks include enterprise management, data management and/or data analytics, such as data analytics to help businesses anticipate customer needs, develop data-driven services and/or improve security intelligence. Any number of clusters may be employed to achieve task objectives, in which each cluster may include different types of computing resources (e.g., different numbers of processing cores, different amounts of memory, etc.).

BRIEF DESCRIPTION OF THE DRAWINGS

FIG. 2 is an example workload executed by the cluster configuration environment of FIG. 1 illustrating example services invoked during configuration management and runtime execution.

DETAILED DESCRIPTION

Figure 1:
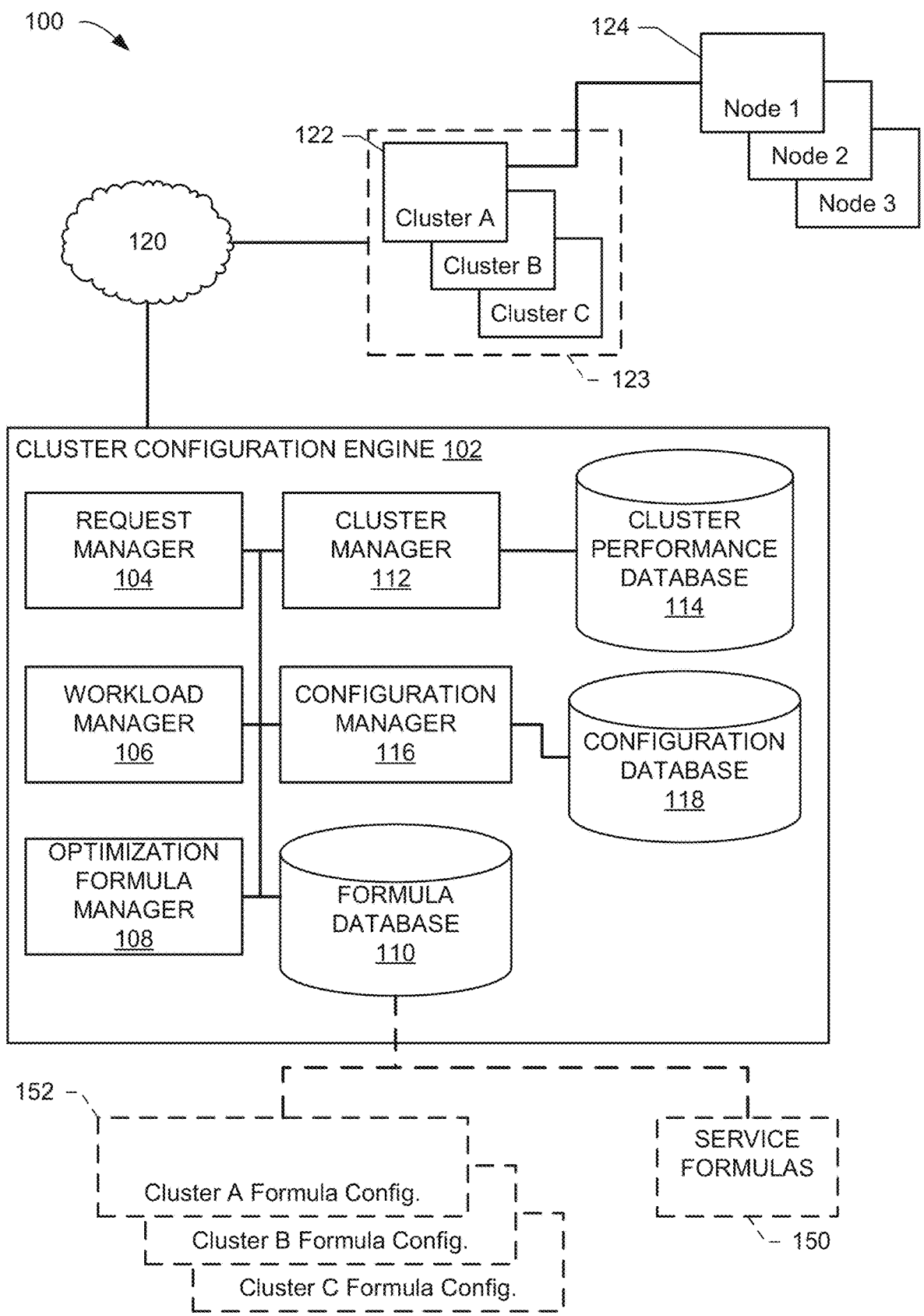
FIG. 1 is a schematic illustration of a cluster configuration environment structured in accordance with the teachings of this disclosure to improve cluster efficiency.

Clusters used in distributed computing applications may include varying configurations, such as various memory capabilities and various core densities. Depending on the workloads to be executed on the clusters, configuration parameters need to be set to handle workload demands. At the time of this writing, well over 600 different configuration parameters exist that, when set correctly, allow the cluster resources to operate in an optimal manner. As such, personnel chartered with the responsibility of configuring the cluster resources (referred to herein as "system users") may spend days, weeks and/or months attempting to tune the cluster resources when performance problems arise during runtime execution of the cluster resources with input data (e.g., large data processing tasks). In some examples, the system users are unfamiliar with the complexities and/or nuances of cluster configurations and deploy workloads that operate on the cluster resources in an inefficient manner (e.g., performance lags due to memory starvation). When one or more configuration parameters are not set correctly, the cluster resources may still operate, but at an impaired efficiency that results in lagged performance.

Workloads that execute on cluster resources may include different types of services to meet computing objectives. Additionally, the different types of services operate on different types and/or quantities of input data, such as input data associated with, but not limited to online dating customer profile data, data pattern research for medical diseases (e.g., Parkinson's Disease research, disease symptom pattern matching, etc.), malware pattern analysis and detection, product data analysis, etc. Example services include, but are not limited to, map reduce jobs, resource managers (e.g., YARN), node managers, history services, cluster framework services (e.g., Spark™), distributed synchronization services (e.g., ZooKeeper™) realtime read/write access services (e.g., HBase™), etc. In some examples, a cluster will execute any number of these services to accomplish workload objectives on the input data. Each service includes recommended and/or industry standard best practice configuration settings that are based on workload requirements and cluster capabilities (e.g., an available amount of memory, a number of available cores, etc.). As described above, over 600 configuration parameters may require appropriate values for optimized performance of the cluster resources.

Example methods, apparatus, systems and/or articles of manufacture disclosed herein evaluate desired workloads to determine appropriate cluster hardware configurations to allow such workloads to be executed in an optimized manner to avoid problems such as, for example, memory starvation. Additionally, examples disclosed herein evaluate the desired workloads as well as existing or candidate cluster hardware configurations to determine appropriate cluster parameter values that facilitate optimized workload performance, thereby improving hardware execution efficiency when processing input data.

FIG. 1 is a schematic illustration of an example cluster configuration environment 100 constructed in accordance with the teachings of this disclosure to improve cluster efficiency. In the illustrated example of FIG. 1, the cluster configuration environment 100 includes a cluster configuration engine 102, a request manager 104, a workload manager 106, an optimization formula manager 108 communicatively connected to a formula database 110, a cluster manager 112 communicatively connected to a cluster performance database 114, and a configuration manager 116 communicatively connected to a configuration database 118. The example cluster configuration engine 102 is communicatively connected to an example communication bus 120, which is communicatively connected to one or more clusters 122. In the illustrated example of FIG. 1, three (3) example clusters are shown (e.g., Cluster A, Cluster B, Cluster C) for purposes of explanation and not limitation. Any number of clusters 122 may be considered by examples disclosed herein. The example communication bus 120 may include any type of communicative connection, such as one or more hardwires, a local area network (LAN), a wide area network (WAN), Firewire, GPIB, etc. Each of the one or more clusters 122 may include one or more nodes 124. In the illustrated example of FIG. 1, three example nodes are shown (e.g., Node 1, Node 2, Node 3) for purposes of explanation and not limitation. Any number of nodes 124 may be considered in respective clusters 122 by examples disclosed herein.

In some examples, the clusters 122 include a cluster distribution engine 123, such as an Apache Hadoop distribution, which may be distributed by any number of Hadoop vendors, such as Cloudera® (sometimes referred to as the Cloudera Distribution including Apache Hadoop (CDH)). In still other examples, the one or more clusters 122 may be resources purchased by the system user, such as racks of servers equipped with one or more Intel® Xeon® processors (e.g., the Xeon® processor E5 family). In some examples, cluster resources may be provided to the system user by cloud service providers to defray a need to invest capital in such computing equipment. In such examples, the cloud service provider may charge a fee based on usage (e.g., a number of processing cycles consumed by the system user's workload, an amount of memory allocated to the system user's workload, a number of processing cores made available to the system user, etc.). Accordingly, the system user may be motivated to configure cluster hardware to operate as efficiently as possible to reduce costs associated with cluster hardware ownership and/or cluster hardware leasing agreements with cloud service providers.

In operation, the example request manager 104 determines whether a configuration request has occurred. For example, the system user may attempt to deploy a cluster for the purpose of executing a workload to meet one or more distributed computing objectives with input data. However, in some examples the system user does not yet have one or more target clusters because a workload analysis has not been performed. As described in further detail below, examples disclosed herein confirm whether candidate specifications of hardware (e.g., a candidate number of cores, a candidate amount of allocated memory, etc.) are sufficient in view of workload details. In response to a configuration request, the example cluster manager 112 determines whether one or more clusters are available by probing the example communication bus 120 for the example cluster distribution engine 123. If the example cluster manager 112 detects one or more available clusters 122 having any number of nodes 124 therein, the cluster manager 112 selects a candidate cluster and retrieves cluster resource details.

In circumstances where the system user does not yet have one or more clusters (e.g., no capital has been spent to purchase cluster hardware, no contract/leasing agreement has been established with a cloud service provider, etc.), the example cluster manager 112 generates a candidate cluster specification or retrieves a candidate cluster specification to determine if the candidate cluster specification details will be suitable for a planned workload. After retrieving cluster resource details (e.g., either owned cluster hardware details, available cluster hardware details from a cloud service provider, or candidate cluster specification details), the example workload manager 106 retrieves workload details. Workload details may be retrieved from a distributed storage and processing framework (e.g., a cluster distribution engine 123, such as CDH) to manage clusters, such as the Apache Hadoop framework. In some examples, workload details are stored in a file format containing one or more services to accomplish storage and/or processing tasks. In other examples, the system user edits an input file (e.g., a YAML file) or populates a user interface served by the example workload manager 106 to allow workload details to be entered by the system user.

As described above, such services of an example workload typically include various recommended configuration settings for associated cluster hardware resources, in which such settings are unknown and/or beyond the technical competence of the system user. As such, examples disclosed herein incorporate service optimization formulas to permit proper configuration settings to occur, which is particularly beneficial for novice system users and/or experienced users that may feel inundated with several hundred unique configuration settings required for achieving efficient performance of the clusters 122 (e.g., reducing an amount of wasted memory resources allocated to a particular service, preventing memory starvation associated with a particular service, etc.). The example formula database 110 stores any number of service optimization formulas 150 specific to workload services that may be invoked for execution on one or more clusters 122. Additionally, examples disclosed herein permit the system user to manage any number of system configurations, some of which perform better than others. In particular, examples disclosed herein associate particular service optimization formulas 150 with corresponding performance metrics of the cluster resources and/or the cluster configuration environment 100. Each configuration is captured as a snapshot representative of particular service optimization formulas 150 and associated performance metrics, thereby allowing the system user to compare cluster configurations, select preferred cluster configuration snapshot(s), and/or revert to one or more particular cluster configuration snapshot(s).

For example, if one of the services selected by the system user is for an HBASE region server, then an example formula will calculate an appropriate memory allocation for a portion of that service that is based on an available system memory and a fraction coefficient for that service, as shown in Example Formula 1 below.

$$\text{MEM\_FOR\_HBASE\_REGION\_SERVERS} = \min(\text{gb\_to\_bytes}(32), \text{int} (\text{constants}[\text{``NM\_WORKER\_MEM''}] * \text{constants}[\text{``MEM\_FRACTION\_FOR\_HBASE''}])) \quad \text{Formula 1}$$

In the illustrated example of Formula 1, the cluster configuration parameter MEM_FOR_HBASE_REGION_SERVERS is one of over 600 parameters that require configuration value calculation based on, for example, industry standard best practices, other competing services within the example workload, and/or cluster hardware capabilities.

The example formula database 110 stores any number of formulas, such as example Formula 1, that may be added by the example optimization formula manager 108 based on an analysis of detected and/or otherwise named services within the system user's workload information. The example optimization formula manager 108 builds a cluster formula configuration 152 for each cluster of interest 122, which is based on (and unique to) the workload details (e.g., which services are included in the workload, a number of threads to be executed, etc.), and the corresponding cluster 122 that is to execute that workload. In the illustrated example of FIG. 1, three (3) example cluster formula configurations 152 are shown (e.g., Cluster A Formula Configuration, Cluster B Formula Configuration, Cluster C Formula Configuration) for purposes of explanation and not limitation. The example formula database 110 may store any number of cluster formula configurations 152 in examples disclosed herein. Additionally, the example formula database 110 stores any generated or modified cluster formula configuration 152 with a timestamp (e.g., date and time of creation or modification). As such, each generated or modified cluster formula configuration 152 reflects a snapshot of a cluster configuration to permit the system user to analyze how one or more configuration adjustments affect cluster performance, as described in further detail below. As described above, examples disclosed herein permit the system user to compare one or more snapshot(s), select preferred configuration settings based on performance metrics, and/or revert cluster configuration settings to one or more prior snapshot(s). Appendix A includes a non-limiting example of a cluster formula configuration 152. In the illustrated example of Appendix A, the cluster formula configuration 152 is written as a Python program, but examples disclosed herein may utilize any other programming language without limitation.

In the event that no prior cluster formula configuration 152 exists for a cluster of interest, the example workload manager 106 parses workload information to identify one or more services therein. For example, the workload manager 106 may provide (e.g., via a web server/service) a user interface for the system user to enter workload details. In other examples, workload details may reside in a file format retrieved from a cluster distribution engine (e.g., CDH).

FIG. 2 is an example workload 200 provided by a system user or a cluster distribution engine 123. In some examples, the workload manager 106 renders the workload 200 as a user interface to allow entry (e.g., line item entry) of one or more services for the workload 200. In other examples, the workload 200 is an editable file that allows the system user to add, remove and/or modify a list of target services of the workload and/or add, remove and/or modify service configuration values (e.g., override values). In the illustrated example of FIG. 2, the workload includes a Java® Virtual Machine (JVM) service 202, an HBASE service 204, a MAPREDUCE service 206, a SPARK service 208, a YARN service 210, and a ZOOKEEPER service 212. While the illustrated example of FIG. 2 shows a particular number of example services, examples disclosed herein are not limited to that particular quantity. In some examples, one or more services may also include one or more sub-services having corresponding configuration parameters in need of value configuration. For instance, the example YARN service 210 may include a resource manager sub-service, a node manager sub-service, a history sub-service, etc.

The example workload manager 106 selects one of the services of interest from the example workload 200, and the example optimization formula manager 108 identifies one or more formulas associated with the selected service of interest. As described above, the example optimization formula manager 108 is communicatively connected to the example formula database 110 that includes service formulas 150 associated with all known services of interest that may execute in distributed computing environments. The example one or more formulas associated with the selected service of interest are appended to a cluster formula configuration 152 (e.g., Cluster A Formula Configuration). In the event the cluster formula configuration 152 has not previously been generated for the cluster of interest, the example optimization formula manager 108 creates a new instance of the cluster formula configuration 152 having an identifier associated with the cluster of interest. The example workload manager 106 determines whether one or more additional services of interest are in the example workload 200 and, if so, another (e.g., the next listed service) service is selected from the workload 200, as described above.

In the illustrated example of FIG. 2, one or more of the services are associated with default values (e.g., threshold values). For example, the HBASE service 204 includes a default memory fraction value of 0.125, the YARN service 210 includes a default memory allocation value of 1024 (Mb), etc. In some examples, particularly in instances where the system user is knowledgeable in particular service/hardware performance nuances, one or more default values are modified. The modifications may occur by, for example, system user editing of the workload 200 via a user interface and/or by editing a file associated with the workload 200 (e.g., a YAML file). The example optimization formula manager 108 analyzes the example workload 200 for any modification of default values with example default safety equations, as shown below in example Formula 2.

"MEM_FRACTION_FOR_HBASE": lambda x: x if
    x is not None and x>=1 else 1          Formula 2.

In the illustrated example of Formula 2, a default value of 1 is applied to the configuration parameter for the HBASE service 204 related to a proportional amount of system memory allocated and/or otherwise reserved for that service. In the event the system user makes a change to this default value, then example Formula 2 verifies that the change satisfies appropriate threshold values to prevent operating violations and/or performance problems when executing on the cluster of interest 122. In the event of one or more operating violations being detected by the example optimization formula manager 108, one or more warning messages may be generated and/or the modified value(s) may be set to allowable limits. To illustrate, the example HBASE service 204 of FIG. 2 declares a value of 0.125 (e.g. an override value entered by the system user) for MEM_FRACTION_FOR_HBASE, which is a value that satisfies the threshold values of example Formula 2. While the example above includes an example for a default safety equation associated with MEM_FRACTION_FOR_HBASE, any number of additional and/or alternate default safety equations may be realized by examples disclosed herein. For instance, the example cluster formula configuration 152 of Appendix A illustrates several other default safety equations.

Once all services from the example workload 200 have been identified and associated formulas have been added to the example cluster formula configuration 152, the example cluster manager obtains cluster hardware details to facilitate configuration parameter calculations. As described above, cluster hardware details may be identified and/or otherwise retrieved by the example cluster manager 112 via a query to the cluster distribution engine 123 (e.g., CDH), while in other examples the cluster hardware details are provided by the system user as candidate possibilities of hardware configuration details that the system user may acquire in the future (e.g., acquire via hardware purchase, acquire via arrangements/lease agreements with a cloud service provider, etc.).

The example optimization formula manager 108 includes the hardware configuration details within the cluster formula configuration 152 and any modifications made by the system user, and calculates configuration parameter values of each formula therein (e.g., see example Formula 1 above and Appendix A having additional examples). At the time the configuration parameter values are calculated, the example optimization formula manager 108 associates the cluster formula configuration 152 with a timestamp, and saves the cluster formula configuration 152 to the example cluster performance database 114. By saving the example cluster formula configuration 152 to the example cluster performance database 114, calculation results associated with the cluster of interest 122 may be compared with corresponding configuration settings of that cluster in connection with demands of the workload 200. In other words, cause-and-effect information may be readily detailed by examples disclosed herein to permit one or more additional and/or alternate iterations of cluster 122 configuration (e.g., the system user may select among any number of snapshots, which are time/date stamped and include cluster configuration details and associated performance metrics). Prior to runtime execution of the cluster of interest 122 to process input data, the example cluster manager 112 configures the example cluster 122 based on the configuration parameters of the calculated cluster formula configuration 152 (e.g., Cluster A Formula Configuration). In some examples, the cluster manager 112 interfaces with CDH 123 to configure the cluster of interest 122 and publish such configuration settings/parameters to one or more nodes 124 of the cluster of interest 122.

Figure 3:
FIG. 3 is an example performance snapshot comparison illustrating performance results after optimization formulas are applied to the example workload of FIG. 2 in connection with cluster hardware details.

When the example configuration for the cluster of interest 122 is calculated in connection with one or more tasks/services of the example workload 200, the example optimization formula manager 108 generates a snapshot of performance characteristics (e.g., resulting parameter values that will result based on the configuration settings). FIG. 3 illustrates a performance snapshot comparison 300 showing performance results for the cluster of interest at a first execution time 302 and performance results for the cluster of interest at a second execution time 304. In the illustrated example of FIG. 3, the first execution time 302 is associated with a first configuration for the cluster of interest 122 when executing services defined by the workload 200, while the second execution time 304 is associated with a second configuration for the cluster of interest 122 when executing a modified set of services of the workload 200 of FIG. 2 (e.g., with one or more settings altered by the system user). The example performance results for the first execution time 302 may be the result of configuration settings based on the workload 200, such as a particular value for a memory fraction of the HBASE service 204 (e.g., MEM_FRACTION_FOR_HBASE: 0.125). However, the example performance results for the second execution time 304 may be the result of configuration settings based on a modified workload and/or other configuration settings for the cluster of interest 122 (e.g., MEM_FRACTION_FOR_HBASE changed from 0.125 to 0.09, a number of threads to execute, etc.).

In the illustrated example of FIG. 3, the performance snapshot comparison 300 includes a first result for an HBASE service Java heapsize 306 having a value of approximately 25 Gb associated with the first execution time 302. On the other hand, the performance snapshot comparison 300 includes a second result for the HBASE service Java heapsize 308 having a value of approximately 18 Gb associated with the second execution time 304. Generally speaking, at least one reason for the reduction in the heapsize from the first execution time 302 to the second execution time 304 is caused by the modification of the configuration parameter MEM_FRACTION_FOR_HBASE from 0.125 to 0.09. The illustrated example of FIG. 3 also includes additional performance snapshot comparison differences between the first execution time 302 and the second execution time 304. For instance, a first result for a MAPREDUCE service heap 310 is approximately 4.4 Gb associated with the first execution time 302, but a second result for the MAPREDUCE service heap 312 is approximately 4.8 Gb associated with the second execution time 304. While the illustrated example of FIG. 3 includes a limited number of snapshot differences between the first execution time 302 and the second execution time 304, the examples of FIG. 3 are not limited thereto. For instance, differences identified by the example cluster manager 112 may be evaluated during runtime of the example cluster of interest 122 when it performs workload services on input data, and include, but are not limited to, overall memory consumption during execution of workload(s), time to execute one or more workloads, number of processing cycles consumed during runtime execution of one or more workloads, etc. In other words, the examples of FIG. 3 illustrate the results of calculating one or more service-specific formulas based on services identified by the workload that are based on cluster 122 hardware capabilities (e.g., amount of memory, number of cores), but the example of FIG. 3 may also include additional data that is derived during runtime execution of the cluster 122 using actual input data. As described above, such additional data derived during instances of cluster 122 runtime with input data include, but are not limited to processor cycles consumed, memory consumed, memory starvation instances, etc.

Figure 4:
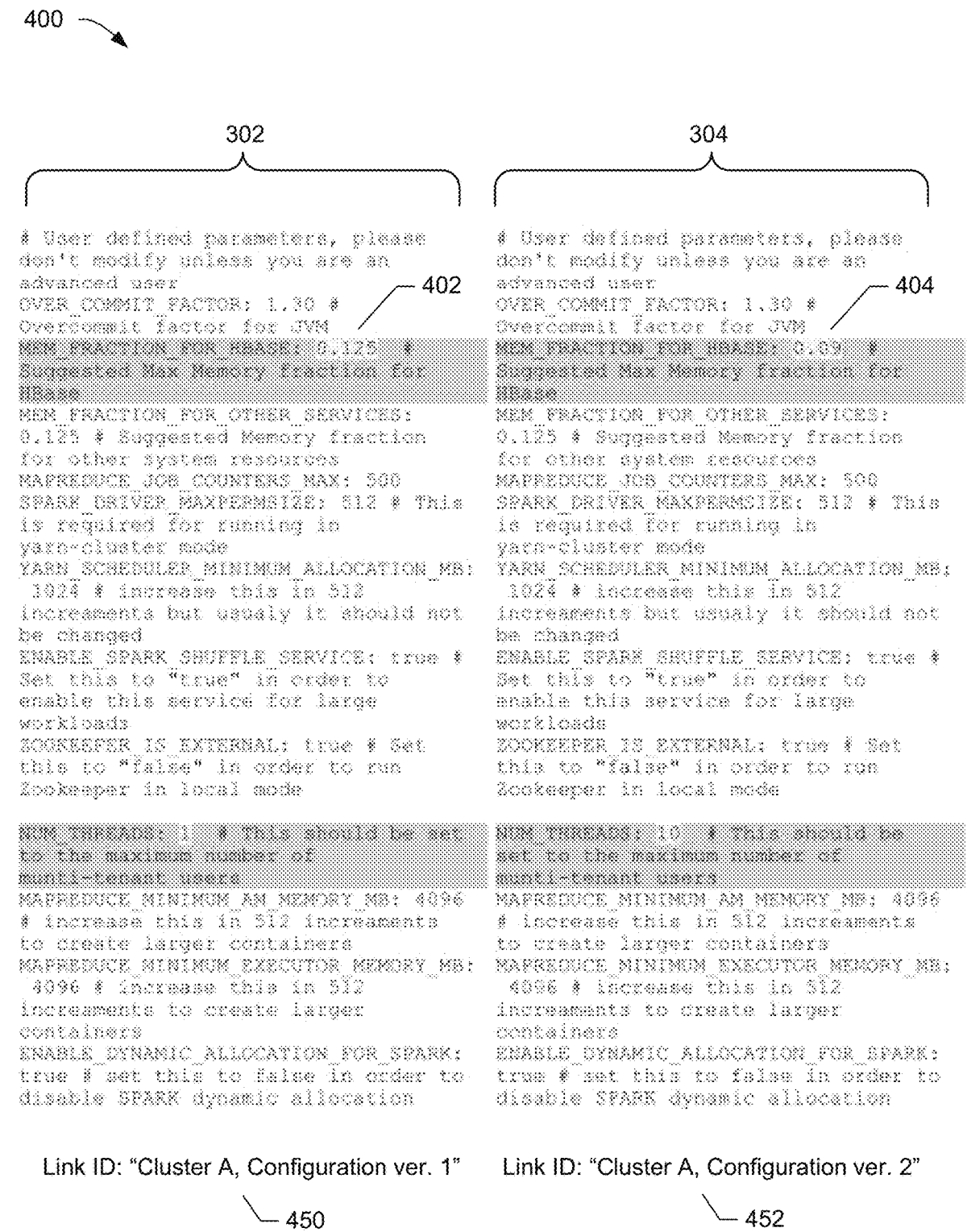
FIG. 4 is an example workload snapshot comparison illustrating workload variations that are linked to the example snapshot comparison details of FIG. 3.

To aid analysis of the performance snapshot comparison 300 of FIG. 3, the example cluster manager 112 also generates a workload snapshot comparison to illustrate differences in workload settings at the first execution time 302 and the second execution time 304. FIG. 4 illustrates a workload snapshot comparison 400 showing workload differences for the cluster of interest at the first execution time 302 and the second execution time 304. In the illustrated example of FIG. 4, the workload for the cluster of interest at the first execution time 302 is the same as the workload 200 of FIG. 2. However, the workload for the cluster of interest at the second execution time 304 includes one or more workload modifications and highlights any workload-related changes from one period of time to another. For example, a first HBASE memory fraction parameter 402 associated with the first execution time 302 includes a value of 0.125, but a second HBASE memory fraction parameter 404 associated with the second execution time 304 includes a value of 0.09.

For each workload configuration (FIG. 4) and associated performance of the cluster of interest (FIG. 3), the example cluster manager 112 generates a linking identifier to allow matching of cluster configuration information with associated cluster performance information. Returning to the illustrated example of FIG. 4, the cluster manager 112 generates a first linking identifier 450 to indicate a cluster of interest ("Cluster A") and an associated configuration version ("Configuration ver. 1"). Additionally, after one or more instances of cluster operation using this particular set of configuration settings, the example cluster manager 112 associates the first linking identifier 450 with corresponding performance snapshot information. In particular, the example cluster manager 112 associates the first linking identifier 450 with the first execution time 302 of the example performance snapshot comparison 300 of FIG. 3. Additionally, in the event an alternate configuration is applied to the cluster of interest, the example cluster manager 112 generates a second linking identifier 452 to indicate a cluster of interest ("Cluster A") and an associated configuration version ("Configuration ver. 2"). After one or more instances of cluster operation using this particular set of configuration settings, the example cluster manager 112 associates the second linking identifier 452 with corresponding performance snapshot information, as shown with the second execution time 304 of the example performance snapshot comparison 300 of FIG. 3. As such, examples disclosed herein facilitate a manner of identifying (a) differences in performance of cluster(s) of interest and (b) configuration settings that contribute to identified differences.

While an example manner of implementing the cluster configuration environment 100 of FIG. 1 is illustrated in FIGS. 1-4, one or more of the elements, processes and/or devices illustrated in FIGS. 1-4 may be combined, divided, re-arranged, omitted, eliminated and/or implemented in any other way. Further, the example request manager 104, the example workload manager 106, the example optimization formula manager 108, the example formula database 110, the example cluster manager 112, the example cluster performance database 114, the example configuration manager 116, the example configuration database 118, the example clusters 122, the example nodes 124, and/or, more generally, the example cluster configuration engine 102 of FIG. 1 may be implemented by hardware, software, firmware and/or any combination of hardware, software and/or firmware. Thus, for example, any of the example request manager 104, the example workload manager 106, the example optimization formula manager 108, the example formula database 110, the example cluster manager 112, the example cluster performance database 114, the example configuration manager 116, the example configuration database 118, the example clusters 122, the example nodes 124, and/or, more generally, the example cluster configuration engine 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example request manager 104, the example workload manager 106, the example optimization formula manager 108, the example formula database 110, the example cluster manager 112, the example cluster performance database 114, the example configuration manager 116, the example configuration database 118, the example clusters 122, the example nodes 124, and/or, more generally, the example cluster configuration engine 102 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example cluster configuration engine 102 of FIG. 1 may include one or more elements, processes and/or devices in addition to, or instead of, those illustrated in FIGS. 1-4, and/or may include more than one of any or all of the illustrated elements, processes and devices.

Figure 5:
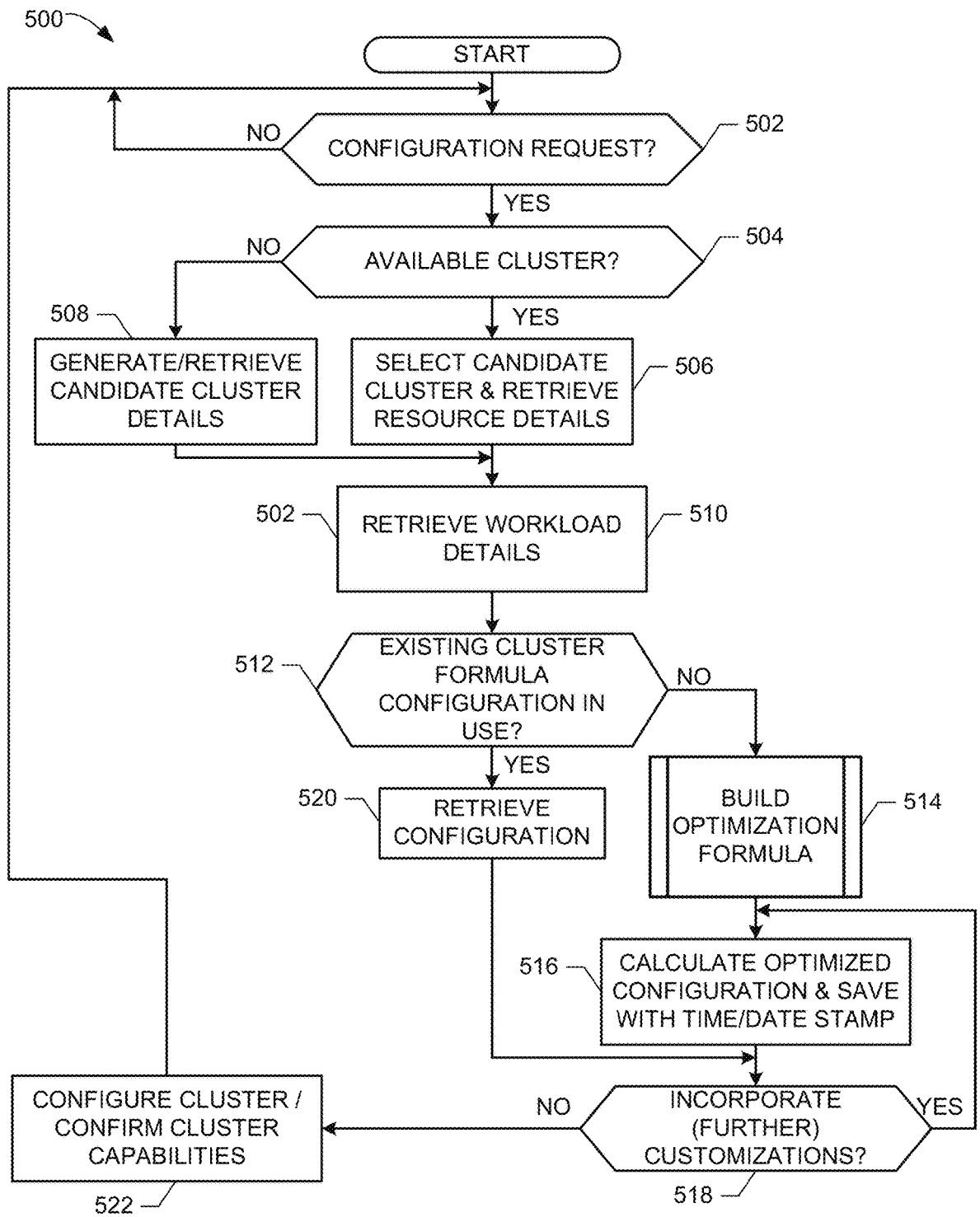
FIGS. 5-6 are flowcharts representative of example machine readable instructions that may be executed to implement the example cluster configuration environment of FIGS. 1-3.
Figure 6:
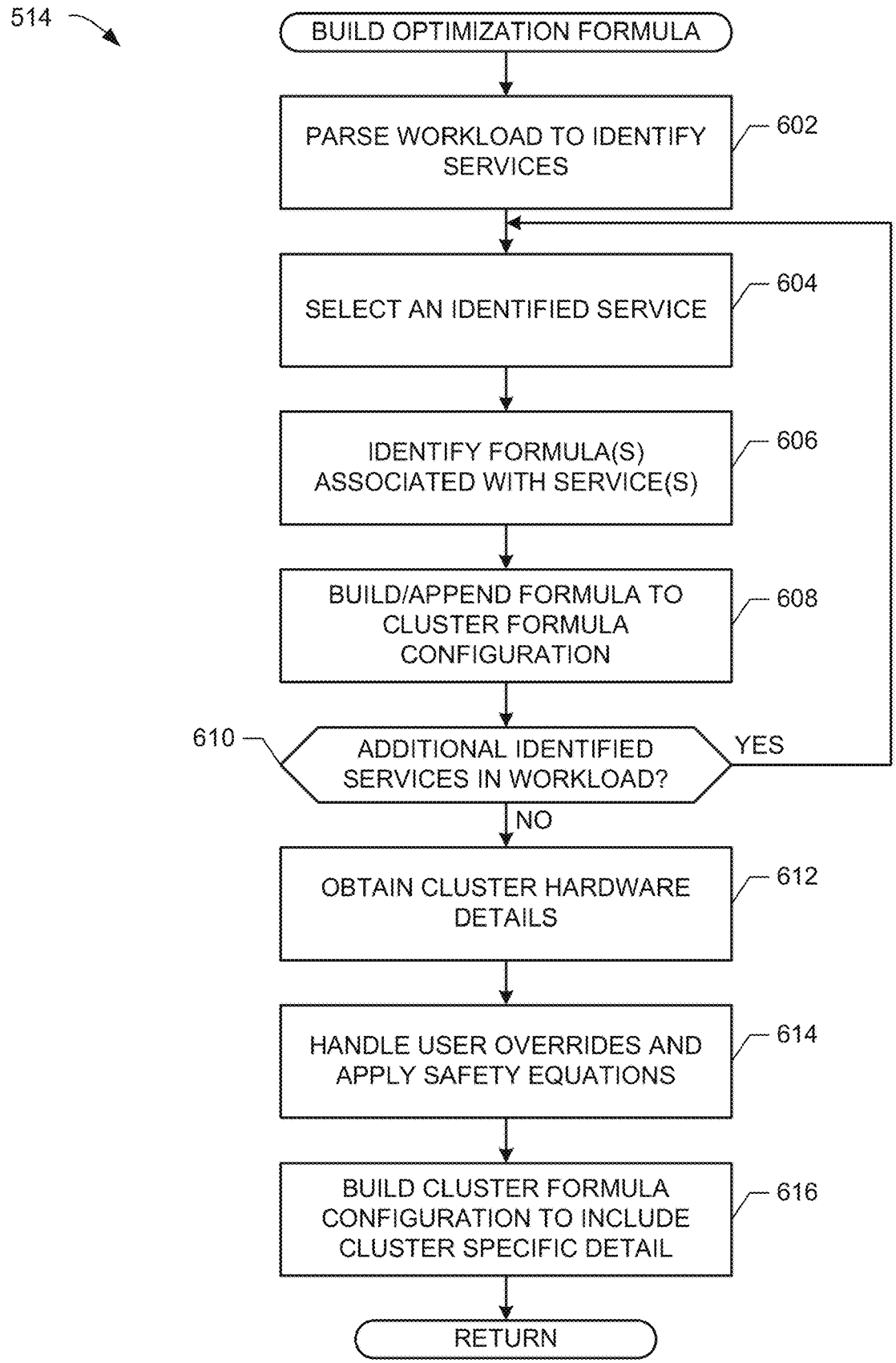

Flowcharts representative of example machine readable instructions for implementing the cluster configuration environment 100 of FIG. 1 are shown in FIGS. 5-6. In these examples, the machine readable instructions comprise a program for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example cluster configuration environment 100 may alternatively be used. For example, the order of execution of the blocks may be changed, and/or some of the blocks described may be changed, eliminated, or combined.

As mentioned above, the example processes of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 500 of FIG. 5 begins at block 502, where the example request manager 104 determines whether a configuration request has occurred. If so, then the example cluster manager 112 determines whether one or more clusters 122 is/are communicatively connected to the example cluster configuration engine 102 (block 504). If the example cluster manager 112 detects one or more clusters 122, such as cluster hardware resources managed by the example cluster distribution engine 123 (e.g., CDH) (block 504), then the cluster manager 112 selects one of the candidate clusters and retrieves cluster resource details (block 506). As described above, each cluster of interest may include varying amounts and/or types of hardware resources, whether they be owned and/or otherwise managed by the system user, or whether such hardware resources are available via a cloud service provider (e.g., Amazon®). Cluster resource details retrieved by the example cluster manager 112 may include, but are not limited to a number of available processor cores, an amount of memory, types of available memory, etc. However, if the example cluster manager 112 determines that there is no available cluster hardware (block 504), then the example cluster manager 112 generates a default set of cluster resource details and/or retrieves candidate cluster resource details from the system user (block 508). For example, examples disclosed herein may allow configuration settings to be calculated in circumstances where the system user does not yet have a particular type of cluster hardware, but may be interested in learning particular types and/or amounts of cluster hardware that might be needed to accomplish computing objectives associated with a workload.

The example workload manager 106 retrieves workload details (block 510), such as workload details from the example workload 200 of FIG. 2. The example configuration manager 116 determines whether an existing cluster configuration formula (e.g., Cluster A Formula Configuration)

has been previously associated with the cluster of interest 122 (block 512). For instance, examples disclosed herein facilitate an iterative analysis of cluster configuration to allow cluster performance information to be compared to corresponding cluster configurations, thereby identifying a cause-and-effect relationship between one or more configuration settings and cluster performance. In the event no prior cluster configuration formula has been generated (block 512), the example optimization formula manager 108 builds a first cluster formula configuration (block 514), as described in further detail below. On the other hand, in the event a prior cluster configuration formula has been generated (block 512), as determined via a query to the example configuration database 114, then the example configuration manager 116 retrieves the cluster formula configuration for further analysis, as described in further detail below.

FIG. 6 includes additional detail associated with building optimization formulas in connection with block 514 of FIG. 5. In the illustrated example of FIG. 6, the example workload manager 106 parses and/or otherwise examines the workload to identify a service of interest (e.g., an HBASE service, a ZOOKEEPER service, a number of threads, etc.) (block 602), and selects one of the identified services (block 604). The example optimization formula manager 108 queries the example formula database 110 to identify one or more formulas associated with the selected service of interest (block 606). As described above, the example formula database 110 includes service formulas 150 that are related to all known services of interest. In some examples, the service formulas 150 include calculations developed by developers of particular services, and in other examples the service formulas 150 include industry standard best practices associated with calculating cluster parameters for optimized performance on cluster hardware 122. When one or more formulas associated with the service of interest are identified (block 606), the example optimization formula manager 108 builds and/or otherwise appends the one or more formulas to the cluster formula configuration 152 (block 608). The example workload manager 106 determines if one or more additional services previously identified have been analyzed to retrieve formulas of interest (block 610) and, if so, control returns to block 604 to select another service of interest from the workload.

When the example workload manager 106 has identified all services of interest from the workload and confirmed that associated formulas have been appended to the cluster formula configuration 152 (block 610), the example cluster manager 112 retrieves and/or otherwise obtains hardware details associated with the cluster of interest 122 (block 612). Additionally, the example optimization formula manager 108 evaluates the workload to determine if one or more system user overrides have been applied (block 614). As described above, the example workload, such as the workload 200 of FIG. 2, may include default values for parameters of the one or more services of interest. For instance, the example HBASE service 204 of FIG. 2 illustrates a default memory fraction value of 0.125, and if the system user changes this value, one or more default safety equations are invoked by the example optimization formula manager 108 to confirm that alternate values satisfy proper operating thresholds (block 614). In the illustrated example of FIG. 2, any modification of default values for the example HBASE service 204 are calculated and/or otherwise evaluated by the example default safety equation described above as Formula 2. After evaluating and/or calculating all default safety equations that are invoked in response to system user adjustments to default values (block 614), the example optimization formula manager 108 builds the cluster formula configuration to include all cluster hardware details (block 616). Control then returns to FIG. 5.

Returning to the illustrated example of FIG. 5, the example optimization formula manager 108 calculates all cluster parameters to generate an optimized cluster formula configuration and saves it to the example formula database 110 as a cluster formula configuration 152 (e.g., the example cluster formula configuration 152 of Appendix A) with a time and/or date stamp (block 516). The example optimization formula manager 108 determines whether any additional system user modifications (e.g., customized parameter value changes) are desired (block 518) and, if so, control returns to block 516 to re-calculate an optimized cluster formula configuration 152. Returning to block 512, in the event the example configuration manager 116 determines that an existing cluster configuration formula (e.g., Cluster A Formula Configuration) has been previously associated with the cluster of interest 122 (e.g., by finding matching linking identifiers), then the configuration manager 116 retrieves such configuration information from the example configuration database 118 (block 520). As such, the example optimization formula manager 108 determines whether one or more changes to that configuration are desired (block 518) to allow re-calculation of a new/alternate cluster formula configuration 152 (block 516).

When a new cluster formula configuration 152 has been calculated or when an existing cluster formula configuration 152 has been modified and then calculated for new/alternate configuration parameters that include customizations (if any) (block 518), the example cluster manager 112 configures the cluster of interest 122 with configuration values and publishes those values to the one or more nodes 124 of the cluster of interest 122 (block 522). In some examples, no actual cluster hardware is available because the system user has yet to decide on a type and/or quantity of cluster hardware 122 to acquire (e.g., via hardware purchase, via cloud-based service providers, etc.). Regardless of whether the cluster formula configuration 152 was calculated based on actual available hardware or based on candidate cluster hardware details, the example performance snapshot comparison 300 of FIG. 3 provides valuable calculated results of cluster 122 performance that permit an optimized specification of cluster hardware that improves execution efficiency, reduces hardware over-spending, and prevents instances of memory starvation when the cluster 122 executes during runtime scenarios with input data.

Figure 7:
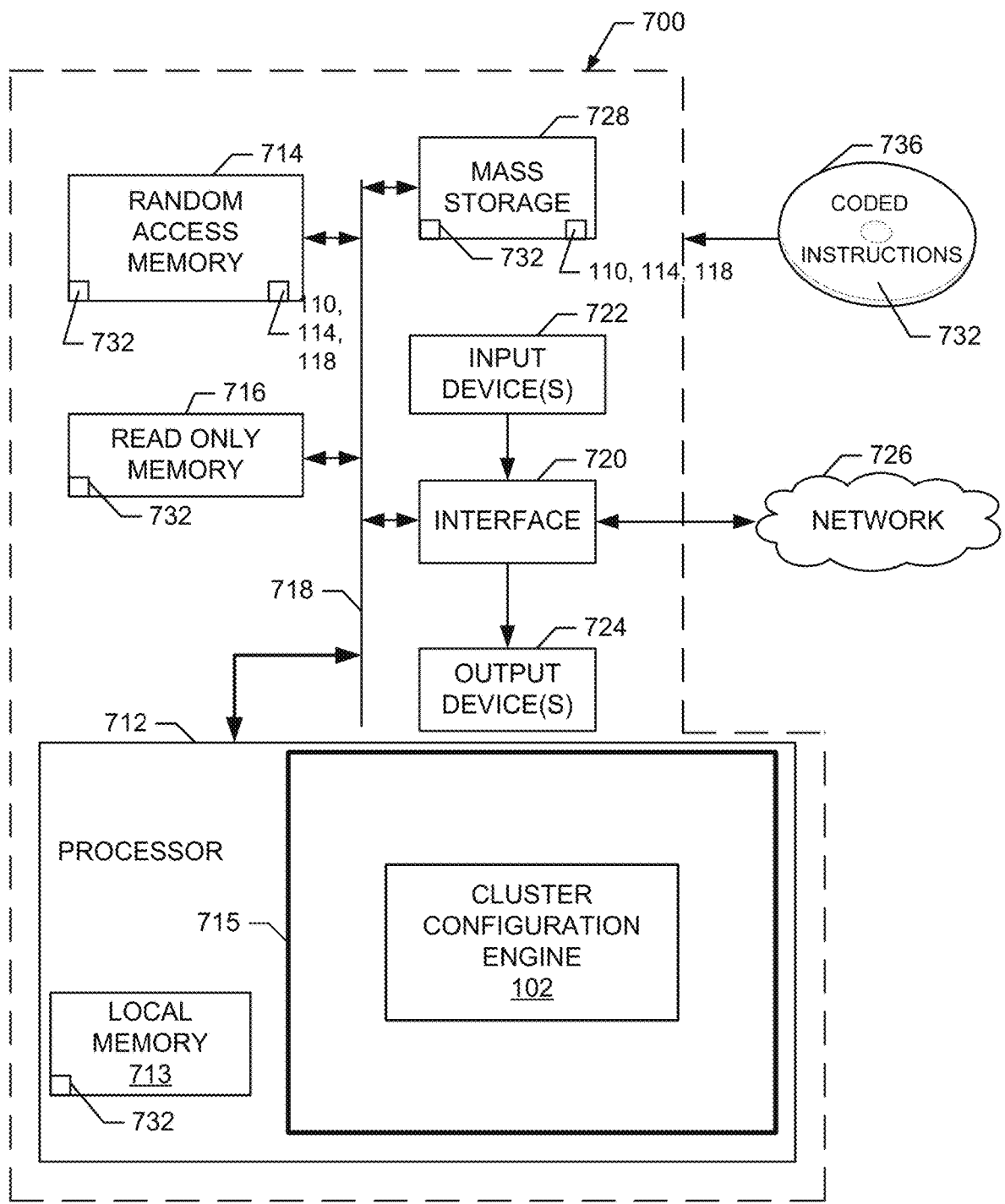
FIG. 7 is a block diagram of an example processor platform structured to execute the example machine readable instructions of FIGS. 5-6 to implement the example cluster configuration environment of FIGS. 1-3.

FIG. 7 is a block diagram of an example processor platform 700 capable of executing the instructions of FIGS. 5-6 to implement the cluster configuration environment 100 of FIG. 1. The processor platform 700 can be, for example, a server, a personal computer, an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In the illustrated example of FIG. 7, the processor 712 includes one or more example processing cores 715 configured via example instructions 732, which include the example instructions of FIGS. 5-6 to implemented the example cluster configuration engine 102 and/or the example cluster configuration environment 100 of FIG. 1.

The processor 712 of the illustrated example includes a local memory 713 (e.g., a cache). The processor 712 of the illustrated example is in communication with a main memory including a random access memory (RAM) 714 and a read only memory (ROM) (e.g., non-volatile memory) 716 via a bus 718. The RAM 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The ROM 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 1012. The input device(s) can be implemented by, for example, a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In some examples, the mass storage device 728 may implement the example formula database 110, the example cluster performance database 114 and/or the example configuration database 118.

The coded instructions 732 of FIGS. 5-6 may be stored in the mass storage device 728, in the RAM 714, in the ROM 716, and/or on a removable tangible computer readable storage medium such as a CD or DVD 736.

From the foregoing, it will be appreciated that the above disclosed methods, apparatus and articles of manufacture have been disclosed that reduce the possibility that cluster resources will be mismanaged due to system user inexperience and/or due to burdens associated with numerous cluster resource configuration parameter management details. In particular, because examples disclosed herein evaluate specific workload details in connection with specific cluster resource details, system users are less likely to incorrectly set cluster resource parameter values and/or apply one or more settings that result in reduced cluster performance efficiency. Additionally, examples disclosed herein permit system users to appreciate the effects of one or more changes to customized cluster resource parameters and/or workload settings by revealing performance results with snapshot data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems and articles of manufacture to improve cluster efficiency are disclosed herein. Further examples and combinations thereof include the following.

Example 1 is an apparatus including a cluster manager to identify cluster resource details to execute a workload, a workload manager to parse the workload to identify services to be executed by cluster resources, and an optimization formula manager to identify service optimization formulas associated with respective ones of the identified services, and improve cluster resource efficiency by generating a cluster formula configuration to calculate cluster parameter values for the cluster resources.

Example 2 includes the apparatus as defined in example 1, further including a request manager to identify a request for cluster resource efficiency in response to receiving the workload.

Example 3 includes the apparatus as defined in example 2, wherein the workload includes a workload edit file having default service values.

Example 4 includes the apparatus as defined in example 3, wherein the optimization formula manager is to calculate operating violations in response to a change to respective ones of the default service values.

Example 5 includes the apparatus as defined in example 1, wherein the cluster resource details include at least one of a number of processing cores or an amount of memory.

Example 6 includes the apparatus as defined in example 1, further including a formula database including the service optimization formulas.

Example 7 includes the apparatus as defined in example 1, further including a cluster manager to generate a workload snapshot comparison between a first workload and a second workload.

Example 8 includes the apparatus as defined in example 7, wherein the cluster manager is to identify workload setting differences between the first workload and the second workload.

Example 9 includes the apparatus as defined in example 8, wherein the workload setting differences include at least one of service value settings, added services, or removed services.

Example 10 includes the apparatus as defined in example 7, wherein the cluster manager is to associate the first workload and first performance data of the cluster resources with a first linking identifier.

Example 11 includes the apparatus as defined in example 10, wherein the first linking identifier is to identify the first performance data of the cluster resources at a first time associated with settings of the first workload, and a second linking identifier is to identify second performance data of the cluster resources at a second time associated with settings of the second workload.

Example 12 includes the apparatus as defined in example 10, wherein the first performance data includes at least one of heap size utilization or service memory utilization.

Example 13 is a method to improve cluster efficiency, comprising identifying cluster resource details to execute a workload, parsing the workload to identify services to be executed by cluster resources, identifying service optimization formulas associated with respective ones of the identified services, and improving cluster resource efficiency by generating a cluster formula configuration to calculate cluster parameter values for the cluster resources.

Example 14 includes the method as defined in example 13, further including identifying a request for cluster resource efficiency in response to receiving the workload.

Example 15 includes the method as defined in example 14, wherein the workload includes a workload edit file having default service values.

Example 16 includes the method as defined in example 15, further including calculating operating violations in response to a change to respective ones of the default service values.

Example 17 includes the method as defined in example 13, wherein the cluster resource details include at least one of a number of processing cores or an amount of memory.

Example 18 includes the method as defined in example 13, wherein the service optimization formulas are retrieved from a formula database.

Example 19 includes the method as defined in example 13, further including generating a workload snapshot comparison between a first workload and a second workload.

Example 20 includes the method as defined in example 19, further including identifying workload setting differences between the first workload and the second workload.

Example 21 includes the method as defined in example 20, wherein the workload setting differences include at least one of service value settings, added services, or removed services.

Example 22 includes the method as defined in example 19, further including associating the first workload and first performance data of the cluster resources with a first linking identifier.

Example 23 includes the method as defined in example 22, further including identifying the first performance data of the cluster resources at a first time associated with settings of the first workload, and identifying second performance data of the cluster resources at a second time associated with settings of the second workload.

Example 24 includes the method as defined in example 22, wherein the first performance data includes at least one of heap size utilization or service memory utilization.

Example 25 is a tangible computer-readable medium comprising instructions which, when executed, cause a processor to at least identify cluster resource details to execute a workload, parse the workload to identify services to be executed by cluster resources, identify service optimization formulas associated with respective ones of the identified services, and improve cluster resource efficiency by generating a cluster formula configuration to calculate cluster parameter values for the cluster resources.

Example 26 includes the tangible computer-readable medium as defined in example 25, wherein the instructions, when executed, further cause the processor to identify a request for cluster resource efficiency in response to receiving the workload.

Example 27 includes the tangible computer-readable medium as defined in example 26, wherein the instructions, when executed, further cause the processor to facilitate a workload edit file having default service values for the workload.

Example 28 includes the tangible computer-readable medium as defined in example 27, wherein the instructions, when executed, further cause the processor to calculate operating violations in response to a change to respective ones of the default service values.

Example 29 includes the tangible computer-readable medium as defined in example 25, wherein the instructions, when executed, further cause the processor to identify cluster resource details of at least one of a number of processing cores or an amount of memory.

Example 30 includes the tangible computer-readable medium as defined in example 25, wherein the instructions, when executed, further cause the processor to retrieve the service optimization formulas from a formula database.

Example 31 includes the tangible computer-readable medium as defined in example 25, wherein the instructions, when executed, further cause the processor to generate a workload snapshot comparison between a first workload and a second workload.

Example 32 includes the tangible computer-readable medium as defined in example 31, wherein the instructions, when executed, further cause the processor to identify workload setting differences between the first workload and the second workload.

Example 33 includes the tangible computer-readable medium as defined in example 32, wherein the instructions, when executed, further cause the processor to identify workload setting differences of at least one of service value settings, added services, or removed services.

Example 34 includes the tangible computer-readable medium as defined in example 31, wherein the instructions, when executed, further cause the processor to associate the first workload and first performance data of the cluster resources with a first linking identifier.

Example 35 includes the tangible computer-readable medium as defined in example 34, wherein the instructions, when executed, further cause the processor to identify the first performance data of the cluster resources at a first time associated with settings of the first workload, and identify second performance data of the cluster resources at a second time associated with settings of the second workload.

Example 36 includes the tangible computer-readable medium as defined in example 34, wherein the instructions, when executed, further cause the processor to include first performance data of at least one of heap size utilization or service memory utilization.

Example 37 is a system to improve cluster efficiency, comprising means for identifying cluster resource details to execute a workload, means for parsing the workload to identify services to be executed by cluster resources, means for identifying service optimization formulas associated with respective ones of the identified services, and means for improving cluster resource efficiency by generating a cluster formula configuration to calculate cluster parameter values for the cluster resources.

Example 38 includes the system as defined in example 37, further including means for identifying a request for cluster resource efficiency in response to receiving the workload.

Example 39 includes the system as defined in example 38, wherein the workload includes a workload edit file having default service values.

Example 40 includes the system as defined in example 39, further including means for calculating operating violations in response to a change to respective ones of the default service values.

Example 41 includes the system as defined in example 37, wherein the cluster resource details include at least one of a number of processing cores or an amount of memory.

Example 42 includes the system as defined in example 37, further including means for retrieving the service optimization formulas from a formula database.

Example 43 includes the system as defined in example 37, further including means for generating a workload snapshot comparison between a first workload and a second workload.

Example 44 includes the system as defined in example 43, further including means for identifying workload setting differences between the first workload and the second workload.

Example 45 includes the system as defined in example 44, wherein the workload setting differences include at least one of service value settings, added services, or removed services.

Example 46 includes the system as defined in example 43, further including means for associating the first workload and first performance data of the cluster resources with a first linking identifier.

Example 47 includes the system as defined in example 46, further including means for identifying the first performance data of the cluster resources at a first time associated with settings of the first workload, and identifying second performance data of the cluster resources at a second time associated with settings of the second workload.

Example 48 includes the system as defined in example 46, wherein the first performance data includes at least one of heap size utilization or service memory utilization.

APPENDIX A

```
def constants(cluster, log):
    """
    Sets the constants needed for calculating the formula.
    :param cluster: Cluster configuration connection
    :param log: simple log interface with log.info, log.error, log.warning,
log.fatal, log.debug
    :return: a dictionary with all constants
    """
    const = {
        "NUM_NM_WORKERS": len(cluster.yarn.nodemanager.hosts.all( )),
        "NM_WORKER_CORES":
cluster.yarn.nodemanager.hosts.max_cores( ),
        "NM_WORKER_MEM":
cluster.yarn.nodemanager.hosts.max_memory( ),
        "MIN_NM_ MEMORY": gb_to_bytes(8),
        # lambdas are cleaner
        "OVER_COMMIT_FACTOR": lambda x: x if x is not None and
x >= 1 else 1,
        "MEM_FRACTION_FOR_HBASE": lambda x: x if x is not None
and x >= 0 and x < 1 else 0.125,
        "MEM_FRACTION_FOR_OTHER_SERVICES": lambda x: x if x
is not None and x >= 0 and x < 1 else 0.125,
        "MAPREDUCE_JOB_COUNTERS_MAX": lambda x: x if x is not
None and x >= 120 else 500,
        "SPARK_DRIVER_MAXPERMSIZE": lambda x: x if x is not
None and x >= 512 else 512,
        "ENABLE_SPARK_SHUFFLE_SERVICE": lambda x: False if
str(x).lower( ) == "false" else True,
        "ZOOKEEPER_IS_EXTERNAL": lambda x: False if
str(x).lower( ) == "false" else True,
        "NUM_THREADS": lambda x: x if x is not None and x > 0 else 1,
        "YARN_SCHEDULER_MINIMUM_ALLOCATION MB":
lambda x: x if x is not None and x >= 1024 else 1024,
        "MAPREDUCE_MINIMUM_AM_MEMORY_MB": lambda x: (x /
512) * 512 if x is not None and x >= 1024 else 1024,
        "MAPREDUCE_MINIMUM_EXECUTOR_MEMORY_MB": lambda
x: (x / 512) * 512 if x is not None and x >= 1024 else 1024,
        "ENABLE_DYNAMIC_ALLOCATION_FOR_SPARK": lambda x:
False if str(x).lower( ) == "false" else True
    }
    if (const["NM_WORKER_MEM"] < (const["MIN_NM_MEMORY"])):
        log.fatal(
            "Running the toolkit with less than {0}GB memory for YARN is
not supported.".format(const["MIN_NM_MEMORY"]))
```

APPENDIX A-continued

```
    elif (const["NM_WORKER_MEM"] <= (gb_to_bytes(256))):
        # Java Heap Size should not go over 25% of total memory per node
manager
        const["MAX_JVM_MEMORY"] = const["NM_WORKER_MEM"] /
4
    else:
        # for node managers with greater than 256 GB RAM, JVM memory
should still be at most 64GB
        const["MAX_JVM_MEMORY"] = gb_to_bytes(64)
    return const
def formula(cluster, log, constants):
    """
    Houses the formula for calculating the optimized formula
    :param cluster: Cluster configuration connection
    :param log: simple log interface with log.info, log.error, log.warning,
log.fatal, log.debug
    :param constants: the calculated constants with any user overrides from
formula-args
    :return: a dictionary with cdh and atk configurations
    """
    cdh = { }
    atk = { }
    # Validate user defined parameters in forumual-args.yaml file
    if (bytes_to_mb(constants["MAX_JVM_MEMORY"]) <
constants["MAPREDUCE_MINIMUM_EXECUTOR_MEMORY_MB"]):
        log.warning("Container larger than {0}MB are not
supported".format(constants["MAX_JVM_MEMORY"]))
    if (constants["MEM_FRACTION_FOR_OTHER_SERVICES"] < 0 or (
            constants["MEM_FRACTION_FOR_OTHER_SERVICES"] >= (1
- constants["MEM_FRACTION_FOR_HBASE"]))):
        log.fatal("{0} must be non-nagative and smaller than
{1}".format("MEM_FRACTION_FOR_OTHER_SERVICES",
                                                                       1 -
constants["MEM_FRACTION_FOR_HBASE"]))
    constants["SPARK_YARN_DRIVER_MEMORYOVERHEAD"] =
max(384, constants["MAPREDUCE_MINIMUM_AM_MEMORY_MB"] *
0.07)
    constants["SPARK_YARN_EXECUTOR_MEMORYOVERHEAD"] =
max(384,
constants["MAPREDUCE_MINIMUM_EXECUTOR_MEMORY_MB"] *
0.07)
    ###### These values are gathered by the tool from Cluster ######
    if (constants["ZOOKEEPER_IS_EXTERNAL"]):
        atk["trustedanalytics.atk.engine.giraph.giraph.zkIsExternal"] = "true"
        ZK_LIST = map(lambda x: x.hostname,
cluster.zookeeper.server.hosts.all( ).values( ))
        atk["trustedanalytics.atk.engine.giraph.giraph.zkList"] = "\"%s\"" %
(",".join(ZK_LIST))
    atk["trustedanalytics.atk.engine.spark.conf.properties.spark.driver.max
PermSize"] = \
        "\"%dm\"" % (constants["SPARK_DRIVER_MAXPERMSIZE"])
    atk["trustedanalytics.atk.engine.spark.conf.properties.spark.yarn.driver.
memoryOverhead"] = \
        "\"%d\"" %
(constants["SPARK_YARN_DRIVER_MEMORYOVERHEAD"])
    atk["trustedanalytics.atk.engine.spark.conf.properties.spark.yarn.execu-
tor.me
moryOverhead"] = \
        "\"%d\"" %
(constants["SPARK_YARN_EXECUTOR_MEMORYOVERHEAD"])
    cdh["YARN.NODEMANAGER.NODEMANAGER_BASE.YARN_
NODEMANAGER_RESOURCE_CPU_VCORES"] =
constants["NM_WORKER_CORES"]
    cdh["YARN.GATEWAY.GATEWAY_BASE.YARN_APP_MAPREDUCE_
AM_RESOURCE_CPU_VCORES"] = 1
    cdh["YARN.GATEWAY.GATEWAY_BASE.MAPREDUCE_JOB_COUNT
ERS_LIMIT"] = constants["MAPREDUCE_JOB_COUNTERS_MAX"]
    cdh["YARN.NODEMANAGER.NODEMANAGER_BASE.NODE-
MANAG
ER_MAPRED_SAFETY_VALVE"] = \
        "<property><name>mapreduce.job.counters.max</name><value>%d
</value>
</property>" % (
            constants["MAPREDUCE_JOB_COUNTERS_MAX"])
    cdh["YARN.RESOURCEMANAGER.RESOURCEMANAGER_
BASE.RESOURCEMANAGER_MAPRED_SAFETY_VALVE"] = \
    cdh["YARN.NODEMANAGER.NODEMANAGER_BASE.NODE-
MANAG
```

APPENDIX A-continued

```
ER_MAPRED_SAFETY_VALVE"]
cdh["YARN.JOBHISTORY.JOBHISTORY_BASE.JOBHISTORY_MAPRE
D_SAFETY_VALVE"] = \
cdh["YARN.NODEMANAGER.NODEMANAGER_BASE.NODE-
MANAG
ER_MAPRED_SAFETY_VALVE"]
    MEM_FOR_OTHER_SERVICES =
int(constants["NM_WORKER_MEM"] *
constants["MEM_FRACTION_FOR_OTHER_SERVICES"])
    MEM_FOR_HBASE_REGION_SERVERS = min(gb_to_bytes(32),
            int(constants["NM_WORKER_MEM"] *
constants["MEM_FRACTION_FOR_HBASE"]))
    MEM_PER_NM = constants["NM_WORKER_MEM"] -
MEM_FOR_OTHER_SERVICES -
MEM_FOR_HBASE_REGION_SERVERS
cdh["HBASE.REGIONSERVER.REGIONSERVER_BASE.HBASE_
REGIONSERVER_JAVA_HEAPSIZE"] = \
    int(MEM_FOR_HBASE_REGION_SERVERS * 0.75)
cdh["YARN.RESOURCEMANAGER.RESOURCEMANAGER_BASE.
YARN_SCHEDULER_INCREMENT_ALLOCATION_MB"] = 512
cdh["YARN.RESOURCEMANAGER.RESOURCEMANAGER_BASE.
YARN_SCHEDULER_MAXIMUM_ALLOCATION_MB"] = \
    (
        int(bytes_to_mb(MEM_PER_NM) -
        max(
            constants["SPARK_DRIVER_MAXPERMSIZE"],
constants["SPARK_YARN_DRIVER_MEMORYOVERHEAD"],
constants["SPARK_YARN_EXECUTOR_MEMORYOVERHEAD"]
        ) * 3
    ) /
cdh["YARN.RESOURCEMANAGER.RESOURCEMANAGER_BASE.
YARN_SCHEDULER_INCREMENT_ALLOCATION_MB"]
    ) *
cdh["YARN.RESOURCEMANAGER.RESOURCEMANAGER_BASE.
YARN_SCHEDULER_INCREMENT_ALLOCATION_MB"]
cdh["YARN.NODEMANAGER.NODEMANAGER_BASE.YARN_
NODEMANAGER_RESOURCE_MEMORY_MB"] = \
cdh["YARN.RESOURCEMANAGER.RESOURCEMANAGER_BASE.
YARN_SCHEDULER_MAXIMUM_ALLOCATION_MB"]
cdh["YARN.GATEWAY.GATEWAY_BASE.MAPREDUCE_MAP_
MEMORY_MB"] = \
    max(
        min(
            (
                (
                cdh[
"YARN.RESOURCEMANAGER.RESOURCEMANAGER_BASE.
YARN_SCHEDULER_MAXIMUM_ALLOCATION_MB"] /
                constants["NM_WORKER_CORES"])
            /
cdh["YARN.RESOURCEMANAGER.RESOURCEMANAGER_BASE.
YARN_SCHEDULER_INCREMENT_ALLOCATION_MB"]
            ) *
cdh["YARN.RESOURCEMANAGER.RESOURCEMANAGER_BASE.
YARN_SCHEDULER_INCREMENT_ALLOCATION_MB"],
            bytes_to_mb(constants["MAX_JVM_MEMORY"])
        ),
constants["MAPREDUCE_MINIMUM_EXECUTOR_MEMORY_MB"]
    )
cdh["YARN.GATEWAY.GATEWAY_BASE.MAPREDUCE_REDUCE_ME
MORY_MB"] = \
    2 * min(
cdh["YARN.GATEWAY.GATEWAY_BASE.MAPREDUCE_MAP_MEMO
RY_MB"],
        bytes_to_mb(constants["MAX_JVM_MEMORY"])
    )
cdh["YARN.GATEWAY.GATEWAY_BASE.MAPREDUCE_MAP_JAVA_
OPTS_MAX_HEAP"] = \
mb_to_bytes(int(cdh["YARN.GATEWAY.GATEWAY_BASE.MAPREDUC
E_MAP_MEMORY_MB"] * 0.75))
cdh["YARN.GATEWAY.GATEWAY_BASE.MAPREDUCE_REDUCE_JA
VA_OPTS_MAX_HEAP"] = \
    2 *
cdh["YARN.GATEWAY.GATEWAY_BASE.MAPREDUCE_MAP_JAVA_
OPTS_MAX_HEAP"]
cdh["YARN.RESOURCEMANAGER.RESOURCEMANAGER_BASE.
YARN_SCHEDULER_MINIMUM_ALLOCATION_MB"] = \
    constants["YARN_SCHEDULER_MINIMUM_ALLOCATION_MB"]
cdh["YARN.RESOURCEMANAGER.RESOURCEMANAGER_BASE.
YARN_SCHEDULER_MAXIMUM_ALLOCATION_VCORES"] = \
cdh["YARN.NODEMANAGER.NODEMANAGER_BASE.YARN_
NODEMANAGER_RESOURCE_CPU_VCORES"]
cdh["YARN.GATEWAY.GATEWAY_BASE.YARN_APP_MAPREDUCE_
AM_RESOURCE_MB"] = \
    constants["MAPREDUCE_MINIMUM_AM_MEMORY_MB"]
cdh["YARN.GATEWAY.GATEWAY_BASE.YARN_APP_MAPREDUCE_
AM_MAX_HEAP"] = \
    mb_to_bytes(
int(cdh["YARN.GATEWAY.GATEWAY_BASE.YARN_APP_MAPREDUC
E_AM_RESOURCE_MB"] * 0.75))
    CONTAINERS_ACCROSS_CLUSTER = \
int(cdh["YARN.NODEMANAGER.NODEMANAGER_BASE.YARN_
NODEMANAGER_RESOURCE_MEMORY_MB"] \
    / (
        (
cdh["YARN.GATEWAY.GATEWAY_BASE.MAPREDUCE_MAP_MEMO
RY_MB"] + (
            2 *
            max(
constants["SPARK_YARN_DRIVER_MEMORYOVERHEAD"],
constants["SPARK_YARN_EXECUTOR_MEMORYOVERHEAD"],
cdh["YARN.RESOURCEMANAGER.RESOURCEMANAGER_BASE.
YARN_SCHEDULER_INCREMENT_ALLOCATION_MB"]
            ) /
cdh["YARN.RESOURCEMANAGER.RESOURCEMANAGER_BASE.
YARN_SCHEDULER_INCREMENT_ALLOCATION_MB"]
        ) *
cdh["YARN.RESOURCEMANAGER.RESOURCEMANAGER_BASE.
YARN_SCHEDULER_INCREMENT_ALLOCATION_MB"]
        )
    ) * constants["NUM_NM_WORKERS"])
    if constants["NUM_THREADS"] >
(CONTAINERS_ACCROSS_CLUSTER / 2):
        log.fatal("Number of concurrent threads should be at most {0}"
            .format((min(CONTAINERS_ACCROSS_CLUSTER,
CONTAINERS_ACCROSS_CLUSTER) / 2))
        )
    log.info(" {0} could be as large as {1} for multi-
tenacty".format("NUM_THREADS",
(CONTAINERS_ACCROSS_CLUSTER / 2)))
    EXECUTORS_PER_THREAD =
int((CONTAINERS_ACCROSS_CLUSTER -
constants["NUM_THREADS"]) / constants["NUM_THREADS"])
    if not constants["ENABLE_DYNAMIC_ALLOCATION_FOR_
SPARK"]:
atk["trustedanalytics.atk.engine.spark.conf.properties.spark.dynamic
Allocation.enabled"] = "false"
atk["trustedanalytics.atk.engine.spark.conf.properties.spark.executor.
instances"] = EXECUTORS_PER_THREAD
    else:
atk["trustedanalytics.atk.engine.spark.conf.properties.spark.dynamic
Allocation.enabled"] = "true"
atk["trustedanalytics.atk.engine.spark.conf.properties.spark.dynamic
Allocation.minExecutors"] = 1
atk["trustedanalytics.atk.engine.spark.conf.properties.spark.dynamic
Allocation.maxExecutors"] = \
    CONTAINERS_ACCROSS_CLUSTER -
constants["NUM_THREADS"]
atk["trustedanalytics.atk.engine.spark.conf.properties.spark.executor.
memory"] = \
    "\"%dm\"" % (
cdh["YARN.GATEWAY.GATEWAY_BASE.MAPREDUCE_MAP_MEMO
RY_MB"] -
int(atk["trustedanalytics.atk.engine.spark.conf.properties.spark.yarn.
executor.memoryOverhead"].strip("\"")))
    atk["trustedanalytics.atk.engine.spark.conf.properties.spark.driver.
cores"] = 1
    atk["trustedanalytics.atk.engine.spark.conf.properties.spark.executor.
cores"] = \
(cdh["YARN.NODEMANAGER.NODEMANAGER_BASE.YARN_NODE
MANAGER_RESOURCE_CPU_VCORES"] *
constants["NUM_NM_WORKERS"] -
    constants["NUM_THREADS"]) \
    / (constants["NUM_THREADS"] * EXECUTORS_PER_THREAD)
atk["trustedanalytics.atk.engine.spark.conf.properties.spark.driver.
memory"] = \
    "\"%dm\"" % (
cdh["YARN.GATEWAY.GATEWAYBASE.YARN_APP_MAPREDUCE_
AM_RESOURCE_MB"] -
```

APPENDIX A-continued

```
int(atk["trustedanalytics.atk.engine.spark.conf.properties.spark.yarn.
driver.memoryOverhead"].strip("\""))
    )
    atk["trustedanalytics.atk.engine.giraph.mapreduce.map.memory.mb"] = \
cdh["YARN.GATEWAY.GATEWAY_BASE .MAPREDUCE_MAP_MEMO
RY_MB"]
    atk["trustedanalytics.atk.engine.giraph.giraph.maxWorkers"] = \
        EXECUTORS_PER_THREAD - 1
atk["trustedanalytics.atk.engine.giraph.mapreduce.map.java.opts.max.
heap"] = \
        "\"-Xmx%sm\"" %
(bytes_to_mb(cdh["YARN.GATEWAY.GATEWAY_BASE.MAPREDUCE_
MAP_JAVA_OPTS_MAX_HEAP"]))
    atk["trustedanalytics.atk.engine.auto-partitioner.broadcast-join-threshold"]
= "\"2048MB\""
atk["trustedanalytics.atk.engine.spark.conf.properties.spark.driver.max
ResultSize"] = "\"2g\""
atk["trustedanalytics.atk.engine.spark.conf.properties.spark.shuffle.io.
preferDirectBufs"] = "false"
    if (constants["ENABLE_SPARK_SHUFFLE_SERVICE"]):
cdh["YARN.JOBHISTORY.JOBHISTORY_BASE.JOBHISTORY_CON-
FIG
_SAFETY_VALVE"] = \
        " {0}\n{1}".format(
            "<property>"
            "<name>""yarn.nodemanager.aux-services""</name>"
            "<value>""spark_shuffle,mapreduce_shuffle""</value>"
            "</property>",
            "<property>"
            "<name>yarn.nodemanager.aux-
services.spark_shuffle.class</name>"
"<value>""org.apache.spark.network.yarn.YarnShuffleService</value>"
            "</property>")
cdh["YARN.NODEMANAGER.NODEMANAGER_BASE.NODE-
MANAG
ER_CONFIG_SAFETY_VALVE"] = \
cdh["YARN.JOBHISTORY.JOBHISTORY_BASE.JOBHISTORY_CON-
FIG
_SAFETY_VALVE"]
cdh["YARN.RESOURCEMANAGER.RESOURCEMANAGER_BASE.
RESOURCEMANAGER_CONFIG_SAFETY_VALVE"] = \
cdh["YARN.JOBHISTORY.JOBHISTORY_BASE.JOBHISTORY_CON-
FIG
_SAFETY_VALVE"]
atk["trustedanalytics.atk.engine.spark.conf.properties.spark.shuffle.service.
enabled"] = "true"
    else:
atk["trustedanalytics.atk.engine.spark.conf.properties.spark.shuffle.service.
enabled"] = "false"
atk["trustedanalytics.atk.engine.spark.conf.properties.spark.yarn.am.wait
Time"] = "1000000"
atk["trustedanalytics.atk.engine.spark.conf.properties.spark.driver.extra
JavaOptions"] = \
        "\"-Xmx%sm\"" %
(bytes_to_mb(cdh["YARN.GATEWAY.GATEWAY_BASE.YARN_APP_M
APREDUCE_AM_MAX_HEAP"]))
atk["trustedanalytics.atk.engine.spark.conf.properties.spark.executor.extra
javaoptions"] = \
        "\"-Xmx%sm\"" %
(bytes_to_mb(cdh["YARN.GATEWAY.GATEWAY_BASE.MAPREDUCE_
MAP_JAVA_OPTS_MAX_HEAP"]))
    return {"cdh": cdh, "atk": atk}
```

What is claimed is:

1. An apparatus comprising:
cluster managing circuitry to:
generate a candidate cluster specification in response to determining that cluster resources are unavailable; and
identify cluster resource details to execute a workload, the cluster resource details based on the candidate cluster specification;
workload managing circuitry to parse the workload to identify services to be executed by candidate cluster resources corresponding to the cluster resource details, respective ones of the identified services having one or more default values for one or more parameters of the candidate cluster resources; and
optimization formula managing circuitry to:
identify service optimization formulas that, when evaluated, calculate values of respective ones of the one or more parameters to execute the respective ones of the identified services on the candidate cluster resources, the service optimization formulas obtained from a database of pre-defined service optimization formulas associated with a plurality of possible services capable of being executed by the candidate cluster resources, the possible services including the identified services;
in response to a user change to the one or more default values corresponding to the identified services, evaluate one or more corresponding default safety equations with the user change to prevent one or more performance problems when the identified services are executed by the candidate cluster resources; and
evaluate the identified service optimization formulas to calculate the values of the respective ones of the one or more parameters for the candidate cluster resources, the values of the respective ones of the one or more parameters to be applied to the candidate cluster resources to configure the candidate cluster resources prior to runtime execution of the workload.

2. The apparatus as defined in claim 1, further including request managing circuitry to identify a request for cluster resource efficiency in response to receiving the workload.

3. The apparatus as defined in claim 1, wherein at least one of the identified services is associated with (a) the one or more default values for the one or more parameters and (b) at least two service optimization formulas.

4. The apparatus as defined in claim 1, wherein the optimization formula managing circuitry is to, in response to determining that the user change will cause the one or more performance problems, set the one or more default values that were changed to allowable.

5. The apparatus as defined in claim 1, wherein the cluster resource details include at least one of a number of processing cores or an amount of memory.

6. The apparatus as defined in claim 1, wherein the cluster managing circuitry is to generate a workload snapshot comparison between a first workload and a second workload.

7. The apparatus as defined in claim 6, wherein the cluster managing circuitry is to identify workload setting differences between the first workload and the second workload.

8. The apparatus as defined in claim 1, wherein the workload is a first workload, and a first linking identifier is to identify first performance data of the candidate cluster resources at a first time associated with settings of the first workload, and a second linking identifier is to identify second performance data of the candidate cluster resources at a second time, the second performance data associated with settings of a second workload.

9. The apparatus defined in claim 1, wherein the optimization formula managing circuitry is to evaluate the one or more corresponding default safety equations by applying the one or more changed default values to the one or more parameters for the respective ones of the identified services.

10. A method to improve cluster efficiency, the method comprising:
generating a candidate cluster specification in response to determining that cluster resources are unavailable;

identifying cluster resource details to execute a workload, the cluster resource details based on the candidate cluster specification;

parsing the workload to identify services to be executed by candidate cluster resources corresponding to the cluster resource details, respective ones of the identified services having one or more default values for one or more parameters of the candidate cluster resources;

identifying service optimization formulas that, when evaluated, calculate values of respective ones of the one or more parameters to execute the respective ones of the identified services on the candidate cluster resources, the service optimization formulas obtained from a database of pre-defined service optimization formulas associated with a plurality of possible services capable of being executed by the candidate cluster resources, the possible services including the identified services;

in response to a user change to the one or more default values corresponding to the identified services, evaluating one or more corresponding default safety equations with the user change to prevent one or more performance problems when the identified services are executed by the candidate cluster resources; and evaluating the identified service optimization formulas to calculate the values of the respective ones of the one or more parameters for the candidate cluster resources, the values of the respective ones of the one or more parameters to be applied to the candidate cluster resources to configure the candidate cluster resources prior to runtime execution of the workload.

11. The method as defined in claim 10, further including identifying a request for cluster resource efficiency in response to receiving the workload.

12. The method as defined in claim 10, wherein at least one of the identified services is associated with (a) the one or more default values for the one or more parameters and (b) at least two service optimization formulas.

13. The method as defined in claim 10, further including generating a workload snapshot comparison between a first workload and a second workload.

14. The method as defined in claim 13, further including identifying workload setting differences between the first workload and the second workload.

15. The method as defined in claim 14, wherein the workload setting differences include at least one of service value settings, added services, or removed services.

16. The method as defined in claim 13, further including associating the first workload and first performance data of the cluster resources with a first linking identifier.

17. The method as defined in claim 16, further including:
identifying the first performance data of the cluster resources at a first time associated with settings of the first workload; and
identifying second performance data of the cluster resources at a second time, the second performance data associated with settings of the second workload.

18. The method as defined in claim 10, further including evaluating the one or more corresponding default safety equations by applying the one or more changed default values to the one or more parameters for the respective ones of the identified services.

19. A tangible computer-readable storage medium comprising instructions which, when executed, cause a processor to at least:
generate a candidate cluster specification in response to determining that cluster resources are unavailable;
identify cluster resource details to execute a workload, the cluster resource details based on the candidate cluster specification;
parse the workload to identify services to be executed by candidate cluster resources corresponding to the cluster resource details, respective ones of the identified services having one or more default values for one or more parameters of the candidate cluster resources;
identify service optimization formulas that, when evaluated, calculate values of respective ones of the one or more parameters to execute the respective ones of the identified services on the candidate cluster resources, the service optimization formulas obtained from a database of pre-defined service optimization formulas associated with a plurality of possible services capable of being executed with the candidate cluster resources, the possible services including the identified services;
in response to a user change to the one or more default values corresponding to the identified services, evaluate one or more corresponding default safety equations with the user change to prevent one or more performance problems when the identified services are executed by the candidate cluster resources; and
evaluate the identified service optimization formulas to calculate the values of the respective ones of the one or more parameters for the candidate cluster resources, the values of the respective ones of the one or more parameters to be applied to the candidate cluster resources to configure the candidate cluster resources prior to runtime execution of the workload.

20. The tangible computer-readable storage medium as defined in claim 19, wherein the instructions, when executed, further cause the processor to identify the cluster resource details of at least one of a number of processing cores or an amount of memory.

21. The tangible computer-readable storage medium as defined in claim 19, wherein at least one of the identified services is associated with (a) the one or more default values for the one or more parameters and (b) at least two service optimization formulas.

22. The tangible computer-readable storage medium as defined in claim 19, wherein the instructions, when executed, further cause the processor to generate a workload snapshot comparison between a first workload and a second workload.

23. The tangible computer-readable storage medium as defined in claim 19, wherein the instructions, when executed, further cause the processor to apply the one or more changed default values to the one or more parameters for the respective ones of the identified services to evaluate the one or more corresponding default safety equations.

24. An apparatus comprising:
at least one tangible computer-readable storage medium;
instructions;
a processor to execute the instructions to:
generate a candidate cluster specification in response to determining that cluster resources are unavailable;
identify cluster resource details to execute a workload, the cluster resource details based on the candidate cluster specification;
parse the workload to identify services to be executed by candidate cluster resources corresponding to the cluster resource details, respective ones of the identified services having one or more default values for one or more parameters of the candidate cluster resources;

identify service optimization formulas that, when evaluated, calculate values of respective ones of the one or more parameters to execute the respective ones of the identified services on the candidate cluster resources, the service optimization formulas obtained from a database of pre-defined service optimization formulas associated with a plurality of possible services capable of being executed with the candidate cluster resources, the possible services including the identified services;

in response to a user change to the one or more default values corresponding to the identified services, evaluate one or more corresponding default safety equations with the user change to prevent one or more performance problems when the identified services are executed by the candidate cluster resources; and evaluate the identified service optimization formulas to calculate the values of the respective ones of the one or more parameters for the candidate cluster resources, the values of the respective ones of the one or more parameters to be applied to the candidate cluster resources to configure the candidate cluster resources prior to runtime execution of the workload.

25. The apparatus as defined in claim 24, wherein the processor is to execute the instructions to identify a request for cluster resource efficiency in response to receiving the workload.

26. The apparatus as defined in claim 24, wherein at least one of the identified services is associated with (a) the one or more default values for the one or more parameters and (b) at least two service optimization formulas.

27. The apparatus as defined in claim 24, wherein the processor is to execute the instructions to, in response to determining that the user change will cause the one or more performance problems, set the one or more default values that were changed to allowable values.

28. The apparatus as defined in claim 24, wherein the cluster resource details include at least one of a number of processing cores or an amount of memory.

29. The apparatus as defined in claim 24, wherein the processor is to execute the instructions to generate a workload snapshot comparison between a first workload and a second workload.

30. The apparatus as defined in claim 29, wherein the processor is to execute the instructions to identify workload setting differences between the first workload and the second workload.

31. The apparatus as defined in claim 24, wherein the workload is a first workload, and a first linking identifier is to identify first performance data of the candidate cluster resources at a first time associated with settings of the first workload, and a second linking identifier is to identify second performance data of the candidate cluster resources at a second time, the second performance data associated with settings of a second workload.

32. The apparatus defined in claim 24, wherein the processor is to execute the instructions to evaluate the one or more corresponding default safety equations by applying the one or more changed default values to the one or more parameters for the respective ones of the identified services.

* * * * *